United States Patent
Iwasaki et al.

(10) Patent No.: US 11,857,385 B2
(45) Date of Patent: Jan. 2, 2024

(54) METHOD OF PRODUCING PLATE DENTURE, CURABLE COMPOSITION FOR STEREOLITHOGRAPHY, AND PLATE DENTURE PRODUCTION KIT

(71) Applicant: Tokuyama Dental Corporation, Tokyo (JP)

(72) Inventors: Akiko Iwasaki, Tokyo (JP); Tatsuya Yamazaki, Tokyo (JP); Takeshi Suzuki, Tokyo (JP)

(73) Assignee: Tokuyama Dental Corporation, Tokyo (JP)

( * ) Notice: Subject to any disclaimer, the term of this patent is extended or adjusted under 35 U.S.C. 154(b) by 0 days.

(21) Appl. No.: 17/758,562

(22) PCT Filed: Feb. 26, 2021

(86) PCT No.: PCT/JP2021/007343
§ 371 (c)(1),
(2) Date: Jul. 8, 2022

(87) PCT Pub. No.: WO2021/187056
PCT Pub. Date: Sep. 23, 2021

(65) Prior Publication Data
US 2023/0137898 A1    May 4, 2023

(30) Foreign Application Priority Data

Mar. 17, 2020 (JP) ................. 2020-045974

(51) Int. Cl.
| | | |
|---|---|---|
| *A61C 13/00* | (2006.01) | |
| *B33Y 10/00* | (2015.01) | |
| *B33Y 80/00* | (2015.01) | |
| *B29C 64/124* | (2017.01) | |
| *C09J 7/30* | (2018.01) | |
| *C09J 7/10* | (2018.01) | |
| *A61C 13/01* | (2006.01) | |
| *A61C 13/10* | (2006.01) | |

(52) U.S. Cl.
CPC .......... *A61C 13/0013* (2013.01); *A61C 13/01* (2013.01); *A61C 13/10* (2013.01); *B29C 64/124* (2017.08); *B33Y 10/00* (2014.12); *B33Y 80/00* (2014.12); *C09J 7/10* (2018.01); *C09J 7/30* (2018.01); *C09J 2301/416* (2020.08); *C09J 2433/00* (2013.01); *C09J 2433/008* (2013.01)

(58) Field of Classification Search
None
See application file for complete search history.

(56) References Cited

U.S. PATENT DOCUMENTS

| | | | |
|---|---|---|---|
| 2011/0195237 A1* | 8/2011 | Patel | B33Y 30/00 |
| | | | 430/284.1 |
| 2011/0236856 A1 | 9/2011 | Kanazawa et al. | |
| 2012/0298886 A1 | 11/2012 | Petersen et al. | |
| 2017/0360534 A1* | 12/2017 | Sun | C08G 18/755 |
| 2019/0053883 A1 | 2/2019 | Sun et al. | |

FOREIGN PATENT DOCUMENTS

| | | |
|---|---|---|
| JP | 2012-505775 A | 3/2012 |
| JP | 2012505775 A | 3/2012 |
| JP | 2014-155878 A | 8/2014 |
| JP | 2016-525150 A | 8/2016 |
| JP | 2019-521188 A | 7/2019 |
| JP | 2019521188 A | 7/2019 |
| WO | 2010043463 A1 | 4/2010 |
| WO | 2014/172716 A1 | 10/2014 |
| WO | 2017223084 A1 | 12/2017 |
| WO | 2020182969 A1 | 9/2020 |
| WO | WO-2020 182969 A1 * | 9/2020 |

OTHER PUBLICATIONS

International Search Report dated Apr. 20, 2021 in International Application No. PCT/JP2021/007343.
Office Action dated Nov. 25, 2022 in Chinese Application No. 202180008256.5.
International Preliminary Report on Patentability dated Nov. 11, 2021, received in International Application No. PCT/JP2021/007343 (in Japanese with English translation).
Office Action dated May 13, 2023 in Chinese Application No. 202180008256.5.

* cited by examiner

*Primary Examiner* — Mohammad M Ameen
(74) *Attorney, Agent, or Firm* — Saliwanchik, Lloyd & Eisenschenk

(57) ABSTRACT

[Object] To provide a method of producing a plate denture using a stereolithography 3D printer, which is capable of producing a plate denture in a short time with a more simplified production process, the plate denture exhibiting excellent occlusion.
[Solving Means] The problem is solved by a method of producing a plate denture, including: adhering an artificial tooth and a denture base photochemically solidified by a stereolithography 3D printer to each other by polymerizing an unpolymerized curable composition for stereolithography present on a surface of the denture base. Further, stronger adhesion between the artificial tooth and the denture base is achieved by mixing, in the curable composition for stereolithography, a polymerization initiator other than a photopolymerization initiator for stereolithography.

4 Claims, No Drawings

METHOD OF PRODUCING PLATE DENTURE, CURABLE COMPOSITION FOR STEREOLITHOGRAPHY, AND PLATE DENTURE PRODUCTION KIT

CROSS-REFERENCE TO RELATED APPLICATIONS

This application is the U.S. national stage application of International Patent Application No. PCT/JP2021/007343, filed Feb. 26, 2021, which claims the benefit under 35 U.S.C. § 119 of Japanese Application No. 2020-045974, filed Mar. 17, 2020, the disclosures of each of which are incorporated herein by reference in their entirety.

TECHNICAL FIELD

The present invention relates to a method of producing a plate denture using a stereolithography 3D printer.

BACKGROUND ART

Since the plate denture is manually prepared one by one in accordance with the shape of the oral cavity of a patient, it takes a lot of time to prepare the plate denture and a heavy burden is placed on a dental clinic, a dental laboratory, and a patient. For this reason, a simple method is desired.

In recent years, production of a denture base and a plate denture using a CAD/CAM system has been proposed. In the production of a denture base and a plate denture, by acquiring 3D data in the oral cavity of a patient and preparing a denture base and a plate denture using a CAD/CAM system, there are advantages that the work efficiency can be improved and a plate denture with stable quality can be prepared.

As the method of preparing a denture base and a plate denture using a CAD/CAM system, various methods have been disclosed.

For example, Patent Literature 1 proposes a method of designing a denture base and a plate denture using a CAD/CAM system and producing them by cutting a mill blank.

Further, Patent Literature 2 proposes a method of producing a denture base using a CAD/CAM system and adhering an artificial tooth to the denture base with a dental composite resin to produce a plate denture.

CITATION LIST

Patent Literature

Patent Literature 1: Japanese Patent Application Laid-open No. 2014-155878
Patent Literature 2: Japanese Unexamined Patent Application Publication No. 2016-525150

SUMMARY OF INVENTION

Technical Problem

The method described in Patent Literature 1 is a method of performing production by cutting a mill blank. The mill blank needs to be large to support as many forms of the plate denture as possible. Further, in many cases, it is necessary to cut a large number of materials from the mill blank. Therefore, this method has drawbacks that not only the material to be removed is wasted, but also the milling tool used for cutting is worn and the cutting process takes time. Further, it is necessary to use an adhesive for bonding an artificial tooth because the mill blank is a cured body, and there is a drawback that the bonding of an artificial tooth takes cost and takes time and effort.

Further, the method described in Patent Literature 2 is formation using a stereolithography 3D printer, and each of a denture base and an artificial tooth is formed first. A denture base is formed in a bath formed of a photocurable composition colored with the color of the denture base, and an artificial tooth is formed in a bath formed of a photocurable composition colored with the color of the artificial tooth. The formed denture base and the formed artificial tooth are cleaned with isopropyl alcohol and then the denture base and the artificial tooth are bonded to each other using a dental adhesive, thereby producing a plate denture. In the existing process of producing a plate denture by stereolithography in this way, there is a drawback that production of a plate denture takes cost and takes time and effort because a process of cleaning an uncured resin is required and an adhesive is required to bond the denture base and the artificial tooth to each other. Even in the case where an existing artificial tooth molded in advance in a mold or the like is used, a similar problem occurs because it is necessary to clean the formed denture base and an adhesive is required to bond the denture base and the artificial tooth to each other.

As described above, in the methods described in Patent Literatures 1 and 2, since it is necessary to adhere a denture base and an artificial tooth to each other with an adhesive and the adhesive is applied by the work of a preparer, the amount of applied adhesive tends to vary among artificial teeth. For this reason, these methods have a drawback that the height and position of the dentition are deviated and the occlusion is not stable.

Therefore, there has been a demand for a method of producing a plate denture that can be produced in a short time by simplifying the process of preparing a plate denture and has excellent occlusion.

Solution to Problem

The present inventors have diligently studied to solve the problem described above. As a result, they have found that by polymerizing, when bonding an artificial tooth and a denture base photochemically solidified by a stereolithography 3D printer to each other, an unpolymerized portion formed of an unpolymerized curable composition for stereolithography present on the surface of the denture base to bond the artificial tooth and the denture base to each other, it is possible to simplify the process of preparing a plate denture, prepare a plate denture in a short time, and make the plate denture have excellent occlusion, and have completed the present invention.

That is, the present invention is a method of producing a plate denture characterized by including: adhering an artificial tooth and a denture base photochemically solidified by a stereolithography 3D printer to each other by polymerizing an unpolymerized portion formed of an unpolymerized curable composition for stereolithography present on a surface of the denture base.

In the present invention, it is favorable that the artificial tooth and the denture base are adhered to each other in a fitted state.

Further, it is favorable that the unpolymerized portion formed of an unpolymerized curable composition for stereolithography present on a surface of the denture base is polymerized with a second polymerization initiator for adhesion different from a first polymerization initiator for stereolithography, and it is more favorable that the second polymerization initiator is a radical polymerization initiator.

Further, it is also favorable that the radical polymerization initiator used as the second polymerization initiator is a photopolymerization initiator having an excitation wavelength different from that of the first polymerization initiator for stereolithography.

The second present invention is a curable composition for stereolithography, including: a first polymerization initiator for stereolithography; and a second polymerization initiator different from the first polymerization initiator.

The third present invention is a plate denture production kit, including: a curable composition for stereolithography including a first polymerization initiator for stereolithography and a polymerization initiator different from a second polymerization initiator; and an artificial tooth.

Advantageous Effects of Invention

In accordance with the present invention, it is possible to provide a method of shortening the time for preparing a plate denture and producing a plate denture having excellent occlusion with stable quality.

MODE(S) FOR CARRYING OUT THE INVENTION

In a method of producing a plate denture according to this embodiment, a denture base is produced by stereolithography using a stereolithography 3D printer. Generally, in the case of photochemically solidifying a denture base by a stereolithography 3D printer, since an unpolymerized curable composition for stereolithography (hereinafter, referred to also as the stereolithography material.) remains on the surface of the stereolithography body, cleaning is performed with ethanol, isopropyl alcohol, or the like in order to remove the stereolithography material. In the present invention, artificial teeth are arranged and the unpolymerized stereolithography material remained on the surface of the denture base is effectively used without performing this cleaning to bond the denture base and the artificial teeth to each other. At this time, it is favorable to form a denture base in which a recessed portion for arranging artificial teeth has been formed.

In this embodiment, the "stereolithography" is one of three-dimensional modeling methods using a 3D printer. Examples of the stereolithography method include an SLA (Stereo Lithography Apparatus) method, a DLP (Digital Light Processing) method, and an inkjet method. The photocurable composition according to this embodiment is particularly suitable for stereolithography of the SLA method or the DLP method.

Examples of the SLA method include a method of obtaining a three-dimensional model by applying a spot-shaped laser beam or LED light to a curable composition for stereolithography. In the case of preparing a dental prosthesis such as a denture base by the SLA method, for example, it only needs to repeat a lamination operation in which the curable composition for stereolithography described below is stored in a container, a spot-shaped laser beam or LED light is selectively applied such that a desired pattern is obtained on the liquid surface of the curable composition for stereolithography to cure the curable composition for stereolithography, a cured layer having a desired thickness is formed on a modeling table, then, the modeling table is lowered or raised to supply one layer of the curable composition for stereolithography onto the cured layer, and the one layer is cured similarly, thereby obtaining the continuous cured layers. As a result, it is possible to prepare a dental prosthesis and the like.

Examples of the DLP method include a method of obtaining a three-dimensional model by applying planar light to a curable composition for stereolithography. For the method of obtaining a three-dimensional model by the DLP method, for example, description of Japanese Patent No. 5111880 and Japanese Patent No. 5235056 can be appropriately referred to. In the case of preparing a dental prosthesis such as a denture base by the DLP method, for example, it only needs to use a lamp that emits light other than a laser beam, such as a high-pressure mercury lamp, an ultra-high-pressure mercury lamp, and a low-pressure mercury lamp, an LED, or the like as a light source, dispose a planar drawing mask in which a plurality of digital micro mirror shutters are arranged in a plane between the light source and the modeling surface of the curable composition for stereolithography, and apply light to the modeling surface of the curable composition for stereolithography via the planar drawing mask to sequentially laminate a cured layer having a predetermined-shaped pattern. As a result, it is possible to prepare a dental prosthesis such as a denture base.

Examples of the inkjet method include a method of ejecting, from an inkjet nozzle, liquid droplets of a curable composition for stereolithography onto a base material in a continuous manner and applying light to the liquid droplets attached to the base material to obtain a three-dimensional model. In the case of preparing a dental prosthesis such as a denture base by the inkjet method, for example, it only needs to repeat an operation of ejecting, from an inkjet nozzle, the curable composition for stereolithography onto the base material while causing the head including the inkjet nozzle and the light source to perform scanning in a plane and applying light to the ejected curable composition for stereolithography to form a cured layer, thereby sequentially laminating a cured layer. As a result, it is possible to prepare a dental prosthesis such as a denture base.

As the light source of the stereolithography 3D printer, an arbitrary light source can be used without any limitation as long as it is capable of curing the curable composition for stereolithography described below. Examples of the light to be applied by the light source include far infrared rays, infrared rays, visible rays, near-ultraviolet rays, and ultraviolet rays. Among these, near-ultraviolet rays or ultraviolet rays are favorable from the viewpoint of the ease and efficiency of the curing work. Specifically, a laser beam, an LED, or the like having the maximum wavelength in the range of 350 nm to 410 nm can be used.

(Curable Composition for Stereolithography)

As the curable composition for stereolithography according to the present invention, a known one can be used without any limitation, and it generally includes a photocurable monomer, a first polymerization initiator for stereolithography, other components, and the like. Specific examples of the components are shown below.

<Photocurable Monomer>

As the photocurable monomer, a monomer that can be cured or polymerized by the action of radicals, ions, or the like generated by light irradiation is used. A known existing monomer having, as a polymerizable functional group, a radical polymerizable group, a cation polymerizable group, or a functional group having both radical polymerizability and cation polymerizability can be used without any limitation. Examples of the radical polymerizable group include a (meth)acryloyl group, a vinyl ester group, and a styryl group, examples of the cation polymerizable group include a vinyl ether group, epoxy, and oxetane, and examples of the functional group having both radical polymerizabiity and cation polymerizability include a styryl group.

Among them, a monomer having a radical polymerizable group is favorable, and a monomer having a (meth)acryloyl group (hereinafter, referred to also as the (meth)acryloyl monomer.) can be suitably used from the viewpoint of ease of availability, ease of aesthetics due to high transparency, and high biosafety.

Specific examples of the (meth)acryloyl monomer include (meth)acryloyl monomers described in the following (1) to (3).

(1) Monofunctional Polymerizable Monomer

A monofunctional (meth)acrylate monomer such as methacrylates such as methyl methacrylate, ethyl methacrylate, isopropyl methacrylate, hydroxyethyl methacrylate, tetrahydrofurfuryl methacrylate, and glycidyl methacrylate, and acrylates corresponding to these methacrylates.

(2) Bifunctional Polymerizable Monomer (i) Aromatic Compound 2,2-bis(methacryloyloxyphenyl)propane, 2,2-bis[4-(3-methacryloyloxy)-2-hydroxypropoxyphenyl]propane (hereinafter, abbreviated as bis-GMA), 2,2-bis(4-methacryloyloxyphenyl)propane, 2,2-bis(4-methacryloyloxypolyethoxyphenyl)propane (hereinafter, abbreviated as D-2.6E), 2,2-bis(4-methacryloyloxydiethoxyphenyl)propane, 2,2-bis(4-methacryloyloxytetraethoxyphenyl)propane, 2,2-bis(4-methacryloyloxypentaethoxyphenyl)propane, 2,2-bis(4-methacryloyloxydipropoxyphenyl)propane, 2(4-methacryloyloxydiethoxyphenyl)-2(4-methacryloyloxytriethoxyphenyl)propane, 2(4-methacryloyloxydipropoxyphenyl)-2-(4-methacryloyloxytriethoxyphenyl)propane, 2,2-bis(4-methacryloyloxypropoxyphenyl)propane, 2,2-bis(4-methacryloyloxyisopropoxyphenyl)propane, and acrylates corresponding to these methacrylates; and a diadduct obtained from the adduct of a (meth)acrylate monomer having an —OH group, such as methacrylates such as 2-hydroxyethylmethacrylate, 2-hydroxypropylmethacrylate, and 3-chloro-2-hydroxypropylmethacrylate and acrylates corresponding to these methacrylates, and a diisocyanate compound having an aromatic group, such as diisocyanatemethylbenzene and 4,4'-diphenylmethanediisocyanate.

(ii) Aliphatic Compound

Ethylene glycol dimethacrylate, diethylene glycol dimethacrylate, triethylene glycol dimethacrylate (hereinafter, abbreviated as 3G), tetraethylene glycol dimethacrylate, neopentyl glycol dimethacrylate, 1,3-butanediol dimethacrylate, 1,4-butanediol dimethacrylate, 1,6-hexanediol dimethacrylate, and acrylates corresponding to these methacrylates; a diadduct obtained from the adduct of a (meth) acrylate monomer having an —OH group, such as methacrylates such as 2-hydroxyethylmethacrylate, 2-hydroxypropylmethacrylate, and 3-chloro-2-hydroxypropylmethacrylate and acrylates corresponding to these methacrylates, and a diisocyanate compound such as hexamethylene diisocyanate, trimethylhexamethylene diisocyanate, diisocyanatemethylcyclohexane, isophorone diisocyanate, and methylenebis(4-cyclohexylisocyanate); 1,2-bis(3-methacryloyloxy-2-hydroxypropoxy)ethyl; urethane dimethacrylate, diurethane dimethacrylate, and the like.

(3) Tri(or More)Functional Polymerizable Monomer

Trifunctional methacrylate such as trimethylolpropane trimethacrylate, trimethylolethane trimethacrylate, pentaerythritol trimethacrylate, and trimethylolmethane trimethacrylate, and trifunctional acrylates corresponding to these methacrylates; a tetra (meth)acrylate monomer such as pentaerythritol tetramethacrylate and pentaerythritol tetraacrylate; a diadduct obtained from the adduct of a diisocyanate compound such as diisocyanatemethylbenzene, diisocyanatemethylcyclohexane, isophorone diisocyanate, hexamethylene diisocyanate, trimethyl hexamethylene diisocyanate, methylenebis (4-cyclohexylisocyanate), 4,4-diphenylmethanediisocyanate, and tolylene-2,4-diisocyanate, and glycidol dimethacrylate.

Examples of the monomer having a cation polymerizable group include a vinyl ether compound; an epoxy compound, an oxetane compound, and a cyclic ether compound such as tetrahydrofuran and oxepane; a bicyclic orthoester compound such as bicycloorthoester and spiroorthoester; a cyclic acetal compound such as spiroorthocarbonate, cyclic carbonate, 1,3,5-trioxan, 1,3-dioxolane, 1,3-dioxepan, 4-methyl-1,3-dioxepan, and 1,3,6-trioxacyclooctane; and a bicyclic acetal compound such as 2,6-dioxabicyclo[2.2.1]heptane, 2,7-dioxabicyclo[2.2.1]heptane, and 6,8-dioxabicyclo[3.2.1]octane. In particular, in the case of considering dental applications, an oxetane compound and an epoxy compound are suitably used from the viewpoint that they are easily available, have small volume shrinkage, and have a quick polymerization reaction.

As the oxetane compound, a known existing one can be used without any limitation. Specific examples thereof include those having one oxetane ring, such as trimethyleneoxide, 3-methyl-3-oxetanylmethanol, 3-ethyl-3-oxetanylmethanol, 3-ethyl-3-phenoxymethyloxetane, 3,3-diethyloxetane, and 3-ethyl-3-(2-ethylhexyloxy)oxetane; 1,4-bis(3-ethyl-3-oxetanylmethyloxy)benzene, 4,4'-bis(3-ethyl-3-oxetanylmethyloxy)biphenyl, 4,4'-bis(3-ethyl-3-oxetanylmethyloxymethyl)biphenyl, ethyleneglycolbis(3-ethyl-3-oxetanylmethyl)ether, diethylene glycolbis(3-ethyl-3-oxetanylmethyl)ether, bis(3-ethyl-3-oxetanylmethyl) diphenoate, trimethylolpropane tris(3-ethyl-3-oxetanylmethyl)ether, and pentaerythritoltetrakis(3-ethyl-3-oxetanylmethyl)ether. Other examples thereof include compounds having two or more oxetane rings, such as the compounds shown below.

(Chem. 1)

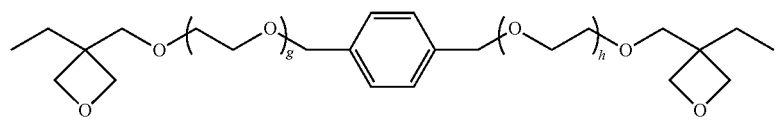

g + h = 0~12

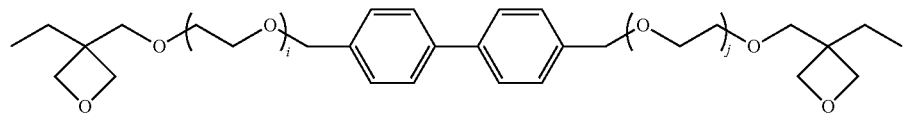

i + j = 0~12

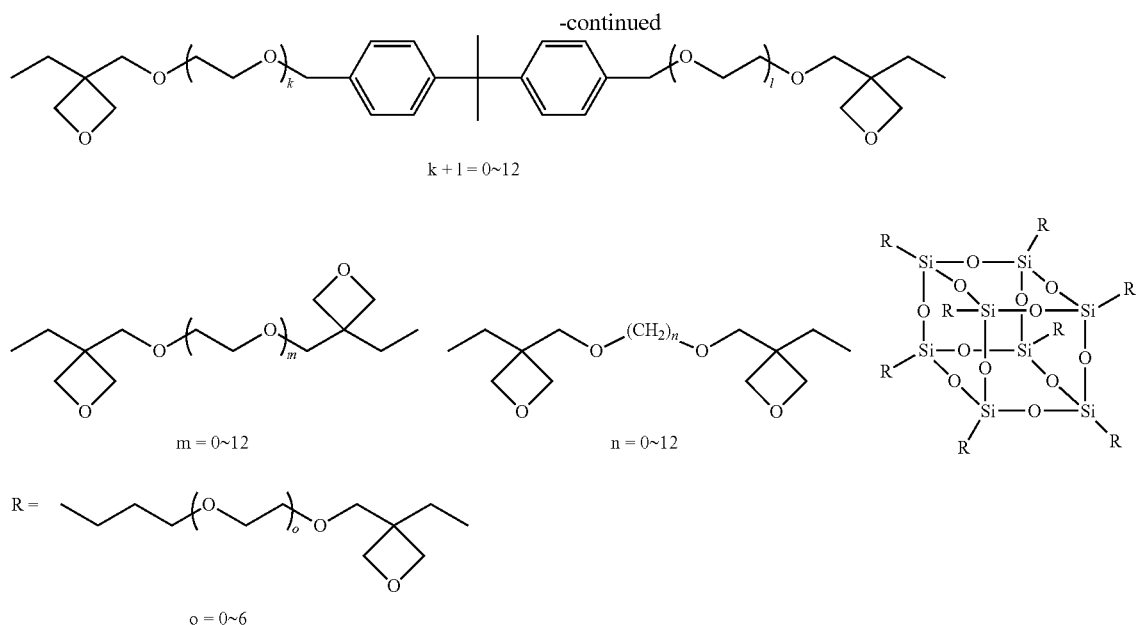

k + l = 0~12 m = 0~12 n = 0~12

R = o = 0~6

In particular, those having two or more oxetane rings in one molecule of the monomer are suitably used from the viewpoint of the physical properties of the obtained cured body.

Further, a known existing one can be used as the epoxy compound without any limitation. Specific examples thereof include diglycerol polyglycidylether, pentaerythritol polyglycidylether, sorbitol polyglycidylether, trimethylolpropane polyglycidylether, resorcin diglycidylether, 1,6-hexanediol diglycidylether, polyethyleneglycol diglycidylether, phenylglycidylether, p-tert-butylphenylglycidylether, adipic acid diglycidylester, o-phthalic acid diglycidylester, dihydroxynaphthalene diglycidylether, dibromophenylglycidylether, 1,2,7,8-diepoxyoctane, 2,2-bis[4-glycidyl oxyphenyl]propane, 1,4-(3,4-epoxycyclohexylmethoxymethyl) benzene, bis(4-glycidyl oxyphenyl)methane, a phenol novolac epoxy resin, an α-naphthol novolac epoxy resin, 3,4-epoxycyclohexylmethyl-3',4'-epoxycyclohexanecarboxylate, 3,4-epoxycyclohexyloxyrane, ethyleneglycol-bis (3,4-epoxycyclohexane carboxylate), 4-vinylcyclohexeneoxide, limonene monoxide, 4-ethylcyclohexeneoxide, 4-methyloxymethylcyclohexeneoxide, 4-benzyloxymethyl-cyclohexeneoxide, 1,2,5,6-diepoxycyclooctane, 3,4-epoxy-cyclohexylmethyl-3,4-epoxycyclohexanecarboxylate, bis(3,4-epoxycyclohexylmethyl)adipate, bis(3,4-epoxycyclohexyl)methane, 1,4-bis(3,4-epoxycyclohexylmethyloxymethyl)benzene, 1,4-bis(3,4-epoxycyclohexylmethyloxymethyl)biphenyl, methylbis[2-(7-oxabicyclo[4.1.0]hept-3-yl)ethyl]phenylsilane, dimethylbis[(7-oxabicyclo[4.1.0]hept-3-yl)methyl]silane, methyl[(7-oxabicyclo[4.1.0]hept-3-yl)methyl][2-(7-oxabicyclo[4.1.0]hept-3-yl)ethyl]silane, 1,4-phenylenebis[dimethyl[2-(7-oxabicyclo[4.1.0]hept-3-yl)ethyl]]silane, 1,2-ethylenebis[dimethyl[2-(7-oxabicyclo[4.1.0]hept-3-yl)ethyl]] silane, dimethyl[2-(7-oxabicyclo[4.1.0]hept-3-yl)ethyl] silane, 1,3-bis[2-(7-oxabicyclo[4.1.0]hept-3-yl)ethyl]-1,1,3,3-tetramethyl disiloxane, 2,5-bicyclo[2.2.1] heptylenebis{dimethyl[2-(7-oxabicyclo[4.1.0]hept-3-yl) ethyl]}silane, and 1,6-hexylenebis{dimethyl[2-(7-oxabicyclo[4.1.0]hept-3-yl)ethyl]}silane. Other examples thereof include the compounds shown below.

(Chem. 2)

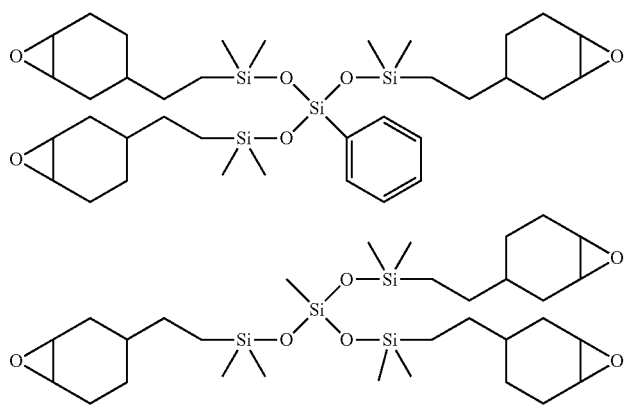

-continued
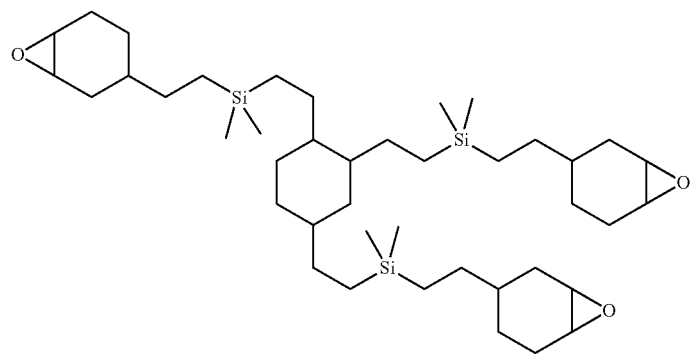
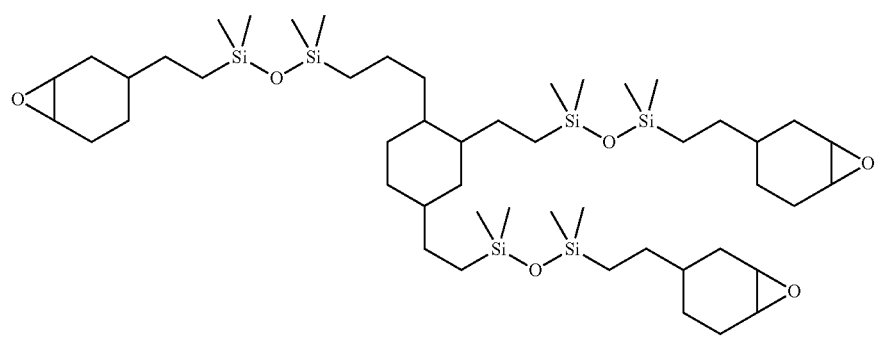
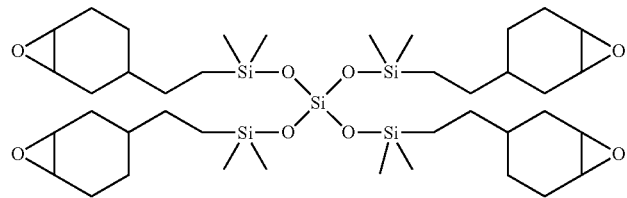
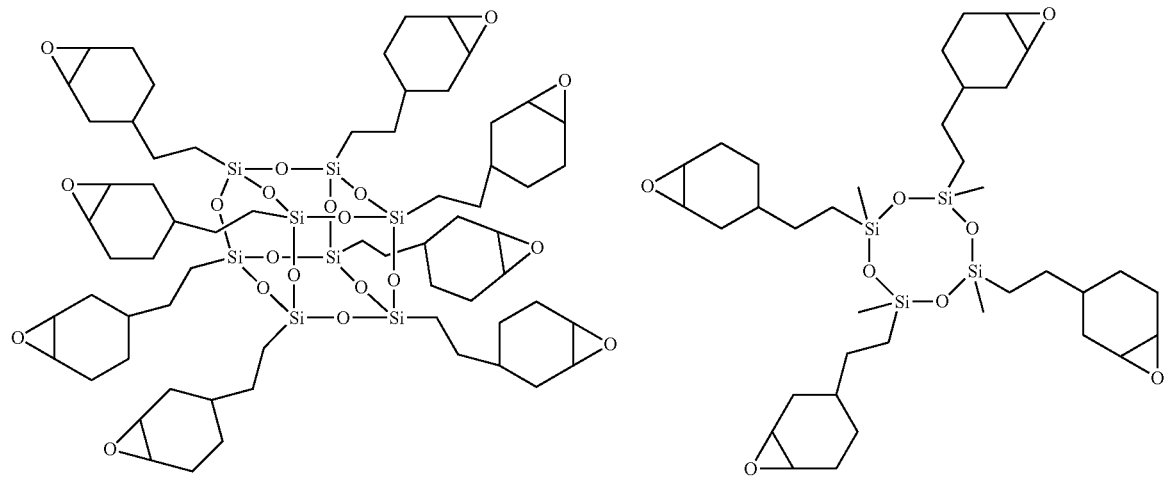
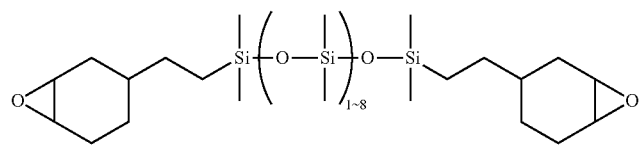

Among them, those having alicyclic epoxy group such as a cyclohexeneoxide group are favorable because of the high cation polymerization activity. Further, from the viewpoint of the physical properties of the cured body, such as mechanical strength, a compound having two or more, suitably two to eight, epoxy groups is particularly favorable.

Among these polymerizable monomers, it is favorable to use a plurality of types in combination because the viscosity can be adjusted to be suitable for stereolithography. In particular, in the case of using a monofunctional one and bifunctional or tri(or more)functional one in combination, it is favorable to mix a large amount of the bifunctional or tri(or more)functional one because the mechanical physical properties of the obtained cured body, such as the strength and the durability, can be made favorable. Further, as necessary, the bifunctional and tri(or more)functional monomers can be heated to form an oligomer and used. In either case, when the viscosity increases too much due to excessive addition, it is not suitable for stereolithography.

<First Polymerization Initiator for Stereolithography>

As the first polymerization initiator for stereolithography, a photopolymerization initiator is used. The photopolymerization initiator is activated by the action of light to initiate the polymerization of a photocurable monomer. In the method of producing a plate denture according to the present invention, a curable composition for stereolithography including a photopolymerization initiator is used and the shape of a plate denture is formed by a 3D printer. In the present invention, the photopolymerization initiator for stereolithography is a photopolymerization initiator used for stereolithography by a 3D printer. Examples of the photopolymerization initiator include a photoacid generating agent that generates an acid by light (hereinafter, referred to also as the photocation polymerization initiator.) in addition to a photoradical polymerization initiator that generates radicals by the action of light. The photopolymerization initiator may be used alone, or two or more types may be used in combination.

Specific examples of the photoradical polymerization initiator include benzoinalkylethers such as benzoinmethylether, benzoinethylether, and benzoinisopropylether, benzylketals such as benzyldimethylketal and benzyldiethylketal, diaryl ketones such as benzophenone, anthraquinone, and thioxanthone, α-diketones such as diacetyl, benzyl, camphorquinone, and 9,10-phenanthraquinone, and acylphosphineoxides such as 2,4,6-trimethylbenzoyl diphenylphosphineoxide, 2,6-dimethoxybenzoyldiphenylphosphineoxide, 2,6-dichlorobenzoyl diphenylphosphineoxide, 2,4,6-trimethylbenzoylphenylphosphinic acid methylester, 2-methylbenzoyl diphenylphosphineoxide, pivaloylphenylphosphinic acid isopropylester, bis-(2,6-dichlorobenzoyl)phenylpho sphineoxide, bis-(2,6-dichlorobenzoyl)-2,5-dimethylphenylphosphineoxide, bis-(2,6-dichlorobenzoyl)-4-propylphenylphosphineoxide, bis-(2,6-dichlorobenzoyl)-1-naphthylphosphineoxide, and bis(2,4,6-trimethylbenzoyl)-phenylphosphineoxide.

The photoradical polymerization initiator described above can be arbitrarily selected in accordance with the light source wavelength of the stereolithography 3D printer. For example, in the case of formation using a stereolithography 3D printer including a light source of 405 nm, acylphosphineoxides having absorption near 400 nm are favorable. Among them, bisacylphosphineoxides such as bis(2,4,6-trimethylbenzoyl)-phenylphosphineoxide are more favorable because of the high activity.

The mixing amount of the photoradical polymerization initiator is not particularly limited, but is favorably in the range of 0.01 to 10 mass parts with respect to 100 mass parts of the photocurable monomer from the viewpoint of the polymerization speed and the mechanical physical properties of the cured body. In particular, 0.05 to 5 mass parts are favorable, and 0.1 to 2 mass parts are more favorable.

Note that a reducing compound is often added to the photoradical polymerization initiator. Examples of the reducing compound include tertiary amines such as 2-(dimethylamino)ethylmethacrylate, 4-(N,N-dimethylamino)ethyl benzoate, N-methyl diethanolamine, and dimethylaminobenzaldehyde, a sulfur-containing compound such as 2-mercaptobenzoxazole, 1-decanethiol, thiosalicylic acid, and thiobenzoic acid, and N-phenylalanine.

The mixing amount of the reducing compound is favorably 0.01 to 10 mass parts, more favorably 0.05 to 5 mass parts, and particularly favorably 0.1 to 2 mass parts with respect to 100 mass parts of the photocurable monomer.

As the photocation polymerization initiator used in the present invention, one that generates polymerization initiating species for a monomer having a cation polymerizable group by light irradiation is used. In particular, a photoacid generating agent that generates a Bronsted acid, a Lewis acid, or the like by light irradiation is suitably used.

Examples of such as photocation polymerization initiator include a diazonium salt compound, an iron-arene complex salt compound, a diaryliodonium salt compound, a sulfonium salt compound, a pyridinium salt compound, a sulfonate ester compound, and a halomethyl substituted-S-triazine derivative.

Among them, a diaryliodonium salt compound and a sulfonium salt compound are excellent because the polymerization activity is particularly high. Examples of the diaryliodonium salt compound include a diaryliodonium salt compound formed of a cation such as diphenyliodonium, bis(p-chlorophenyl)iodonium, ditolyliodonium, bis(p-tert-butylphenyl)iodonium, p-isopropylphenyl-p-methylphenyliodonium, bis(m-nitrophenyl)iodonium, p-tert-butylphenylphenyliodonium, p-methoxyphenylphenyliodonium, bis(p-methoxyphenyl)iodonium, p-octyloxyphenylphenyliodonium, and p-phenoxyphenylphenyliodonium and an anion such as chloride, bromide, p-toluenesulfonate, trifluoromethanesulfonate, tetrafluoroborate, tetrakispentafluorophenylborate, tetrakispentafluorophenylgallate, hexafluorophosphate, hexafluoroarsenate, and hexafluoroantimonate.

Further, examples of the sulfonium salt compound include a sulfonium salt compound formed of a cation such as dimethylphenacylsulfonium, dimethylbenzylsulfonium, dimethyl-4-hydroxyphenylsulfonium, dimethyl-4-hydroxynaphthylsulfonium, dimethyl-4,7-dihydroxynaphthylsulfonium, dimethyl-4,8-dihydroxynaphthylsulfonium, triphenylsulfonium, p-tolyldiphenylsulfonium, p-tert-butylphenyl diphenylsulfonium, and diphenyl-4-phenylthiophenylsulfonium and an anion such as chloride, bromide, p-toluenesulfonate, trifluoromethanesulfonate, tetrafluoroborate, tetrakispentafluorophenylborate, tetrakispentafluorophenylgallate, hexafluorophosphate, hexafluoroarsenate, and hexafluoroantimonate.

The mixing amount of the photocation polymerization initiator is not particularly limited as long as the polymerization can be initiated by light irradiation, but is favorably 0.001 to 10 mass parts and more favorably 0.01 to 5 mass parts with respect to 100 mass parts of the photocurable monomer described above in order to achieve both an appropriate polymerization speed and various physical properties (e.g., weather resistance and hardness) of the cured body.

In addition, a compound having absorption in the near-ultraviolet to visible region may be further mixed as a sensitizer as necessary in addition to the photoacid generating agent described above. Examples of the compound used as a sensitizer include an acridine dye, a benzoflavine dye, a fused polycyclic aromatic compound such as anthracene and perylene, and phenothiazine.

Among these sensitizers, a fused polycyclic aromatic compound is favorable in terms of favorable polymerization activity, and a fused polycyclic aromatic compound having a structure in which a saturated carbon atom having at least one hydrogen atom is bonded to a fused polycyclic aromatic ring is suitable.

Specific examples of the fused polycyclic aromatic compound having a structure in which a saturated carbon atom having at least one hydrogen atom is bonded to a fused polycyclic aromatic ring include 1-methylnaphthalene, 1-ethylnaphthalene, 1,4-dimethylnaphthalene, acenaphthene, 1,2,3,4-tetrahydrophenanthrene, 1,2,3,4-tetrahydro anthracene, benzo[f] phthalan, benzo[g]chromane, benzo[g] isochromane, N-methylbenzo[f]indoline, N-methylbenzo[f] isoindoline, phenalene, 4,5-dimethylphenanthrene, 1,8-dimethylphenanthrene, acephenanthrene, 1-methylanthracene, 9-methylanthracene, 9-ethylanthracene, 9-cyclohexylanthracene, 9,10-dimethylanthracene, 9,10-diethylanthracene, 9,10-dicyclohexylanthracene, 9-methoxymethylanthracene, 9-(1-methoxyethyl)anthracene, 9-hexyloxymethylanthracene, 9,10-dimethoxymethylanthracene, 9-dimethoxymethylanthracene, 9-phenylmethylanthracene, 9-(1-naphthyl) methylanthracene, 9-hydroxymethylanthracene, 9-(1-hydroxyethyl)anthracene, 9,10-dihydroxymethylanthracene, 9-acetoxymethylanthracene, 9-(1-acetoxyethyl)anthracene, 9,10-diacetoxymethylanthracene, 9-benzoyloxymethylanthracene, 9,10-dibenzo yloxymethylanthracene, 9-ethylthiomethylanthracene, 9-(1-ethylthioethyl)anthracene, 9,10-bis (ethylthiomethyl)anthracene, 9-mercaptomethylanthracene, 9-(1-mercaptoethyl)anthracene, 9,10-bis(mercaptomethyl) anthracene, 9-ethylthiomethyl-10-methylanthracene, 9-methyl-10-phenylanthracene, 9-methyl-10-vinyl anthracene, 9-allylanthracene, 9,10-diallylanthracene, 9-chloromethylanthracene, 9-bromomethylanthracene, 9-iodomethylanthracene, 9-(1-chloroethyl)anthracene, 9-(1-bromoethyl) anthracene, 9-(1-iodoethyl)anthracene, 9,10-dichloromethylanthracene, 9,10-dibromomethylanthracene, 9,10-diiodomethylanthracene, 9-chloro-10-methylanthracene, 9-chloro-10-ethylanthracene, 9-bromo-9-bromo-10-ethylanthracene, 9-iodo-10-methylanthracene, 9-iodo-10-ethylanthracene, 9-methyl-10-dimethylaminoanthracene, aceanthrene, 7,12-dimethylbenz(A)anthracene, 7,12-dimethoxymethylbenz(a)anthracene, 5,12-dimethylnaphthacene, cholanthrene, 3-methylcholanthrene, 7-methylbenzo(A) pyrene, 3,4,9,10-tetramethylperylene, 3,4,9,10-tetrakis(hydroxymethyl)perylene, violanthrene, isoviolanthrene, 6,13-dimethylpentacene, 8,13-dimethylpentaphen, 5,16-dimethylhexacene, and 9,14-dimethylhexaphen.

Further, examples of the fused polycyclic aromatic compound other than the above include naphthalene, phenanthrene, anthracene, naphthacene, benz[a]anthracene, pyrene, and perylene.

The amount of the sensitizer to be added is favorably 0.001 to 20 mol and more favorably 0.005 to 10 mol with respect to 1 mol of the photocation polymerization initiator described above depending on the other components to be combined and the type of the polymerizable monomer.

The photopolymerization initiator as the first polymerization initiator for stereolithography is not limited to these examples as long as it is excited by the light source of the 3D printer to exhibit catalyst activity. These may be used alone or two or more types may be combined.

<Other Components>

In the present invention, a filler may be added as another component for the purpose of adjusting the viscosity of the photocurable monomer and imparting mechanical strength to the denture base. A known filler can be used as the filler without any limitation. Examples of the filler include an inorganic filler, an organic filler, and an organic-inorganic composite filler.

Examples of the inorganic filler include metal oxides such as quartz, silica, alumina, silica titania, silica zirconia, lanthanum glass, barium glass, and strontium glass.

The inorganic filler is favorably surface-treated with a surface treatment agent typified by a silane coupling agent from the viewpoint of improving the compatibility with the radical polymerizable monomer and improving the mechanical strength and water resistance.

Examples of the surface treatment include a known method, and examples of the silane coupling agent include methyl trimethoxysilane, methyl triethoxysilane, methyl trichlorosilane, dimethyl dichlorosilane, trimethylchlorosilane, vinyl trichlorosilane, vinyl triethoxysilane, vinyltris(β-methoxyethoxy)silane, γ-methacryloyloxypropyltrimethoxysilane, γ-chloropropyl trimethoxysilane, γ-glycidoxypropyl trimethoxysilane, and hexamethyl disilazane. Note that as the filler, one type may be used alone or two or more types may be combined.

The particle size of the inorganic filler is not particularly limited, but the average particle diameter is favorably 0.001 to 100 μm, more favorably 0.01 to 10 μm, and particularly favorably 0.1 to 5 μm in consideration of improving the mechanical strength of the obtained cured body and achieving the polishability.

Examples of the organic filler include poly(methyl methacrylate) (PMMA), highly cross-linked PMMA beads, poly (methyl/ethyl methacrylate), poly(methyl/butyl methacrylate), rubber modified PMMA, cross-linked polyacrylate, thermoplastic and cross-linked polyurethane, the grinded polymerizable compound according to the present invention, polyethylene, polypropylene, polycarbonate, and polyepoxide.

The particle size of the organic filler is not particularly limited, but the average particle diameter is favorably 0.1 to 200 μm, more favorably 1 to 100 μm, and particularly favorably 5 to 75 μm in consideration of the mechanical strength of the obtained cured body.

Further, examples of the organic-inorganic composite filler include a composite of the inorganic filler described above and the monomer described above as a photocurable monomer. The particle size of the organic-inorganic composite filler is not particularly limited, but the average particle diameter is favorably 0.1 to 200 μm, more favorably 1 to 100 μm, and particularly favorably 5 to 75 μm in consideration of the mechanical strength of the obtained cured body.

Note that in the present invention, the average particle diameter of the filler is a median diameter measured by a laser diffraction/scattering method. Specifically, a dispersion medium in which a filler is favorably dispersed and an organic filler or an organic-inorganic composite filler is not dissolved or swollen, such as ethanol, a mixed solvent of water and ethanol, and water containing a surfactant, is used to measure the average particle diameter by the Fraunhofer diffraction method.

The shape of the filler is not particularly limited and may be a spherical shape, a substantially spherical shape, an irregular shape, or an amorphous shape. However, the shape of the filler is favorably a spherical shape from the viewpoint of ease of viscosity adjustment. Further, a filler having pores may be used for the purpose of improving the mechanical strength.

Among these fillers, PMMA is favorable in that it imparts favorable mechanical properties to the curable composition for stereolithography, and the molecular weight of PMMA is favorably approximately 10,000 to 400,000 g/mol from the viewpoint of ease of adjusting the fluidity.

The mixing of the filler is not particularly limited, but the mixing amount is favorably within the range of 0 to 300 mass parts, more favorably 2 to 200 mass parts, and particularly favorably 5 to 100 mass parts with respect to the total 100 mass parts of the components other than the filler in the curable composition for stereolithography.

In the present invention, the curable composition for stereolithography may include one or more light stabilizers. Specifically, the curable composition for stereolithography is not particularly limited, and examples thereof include hydroquinone, hydroquinone monomethylether, and dibutylhydroxytoluene.

Further, from the viewpoint of aesthetics, a pigment composition including a pigment or a combination of pigments may be arbitrarily included in order to perform coloring with a color close to that of the gingiva. The pigment is not particularly limited as long as it does not interfere with stereolithography by a 3D printer and is resistant to discoloration. Further, an ultraviolet absorber may be included from the viewpoint of light resistance.

<Second Polymerization Initiator for Adhering Artificial Tooth>

In the method of producing a plate denture according to the present invention, a second polymerization initiator other than the above-mentioned first polymerization initiator for stereolithography may be further used in order to adhere a photochemically solidified denture base and an artificial tooth to each other by polymerizing an unpolymerized portion formed of an unpolymerized curable composition for stereolithography present on the surface of the denture base. In particular, by using a second polymerization initiator different from a first polymerization initiator for stereolithography, it is possible to further strengthen the adhesion between the denture base and the artificial tooth described below. Examples of such a second polymerization initiator include, as a radical polymerization initiator, a thermal polymerization initiator and a photopolymerization initiator.

Examples of the thermal polymerization initiator include an organic peroxide, an inorganic peroxide, and azo compounds.

Specific examples of the organic peroxide include, as a ketone peroxide, a methylethylketone peroxide, a methylisobutylketone peroxide, a methylcyclohexanone peroxide, and a cyclohexanone peroxide. Examples of the hyperoxide include 2,5-dimethylhexane-2,5-dihydroperoxide, diisopropylbenzenehydroperoxide, cumenehydroperoxide, t-butylhydroperoxide, and 1,1,3,3-tetramethylbutylhydroperoxide. Examples of the diacylperoxide include acetylperoxide, isobutyrylperoxide, benzoylperoxide, decanoylperoxide, 3,5,5-trimethylhexanoylperoxide, 2,4-dichlorobenzoylperoxide, and lauroylperoxide. Examples of the dialkylperoxide include di-t-butylperoxide, dicumylperoxide, t-butylcumylperoxide, 2,5-dimethyl-2,5-di(t-butylperoxy)hexane, 1,3-bis(t-butylperoxyisopropyl)benzene, and 2,5-dimethyl-2,5-di(t-butylperoxy)-3-hexyne. Examples of the peroxyketal include 1,1-bis(t-butylperoxy)-3,3,5-trimethylcyclohexane, 1,1-bis(t-butylperoxy)cyclohexane, 2,2-bis(t-butylperoxy)butane, 2,2-bis(t-butylperoxy)octane, and 4,4-bis(t-butylperoxy)valeric acid-n-butyl. Examples of the peroxyester include α-cumylperoxyneodecanoate, t-butylperoxyneodecanoate, t-butylperoxypivalate, 2,2,4-trimethylpentylperoxy-2-ethylhexanoate, t-amylperoxy-2-ethylhexanoate, t-butylperoxy-2-ethylhexanoate, di-t-butylperoxyisophthalate, di-t-butylperoxyhexahydroterephthalate, t-butylperoxy-3,3,5-trimethylhexanoate, t-butylperoxyacetate, t-butylperoxybenzoate, and t-butylperoxyvaleric acid. Examples of the peroxy dicarbonate include di-3-methoxyperoxy dicarbonate, di-2-ethylhexylperoxy dicarbonate, bis(4-t-butylcyclohexyl)peroxy dicarbonate, diisopropylperoxy dicarbonate, di-n-propylperoxy dicarbonate, di-2-ethoxyethylperoxy dicarbonate, and diallylperoxy dicarbonate.

Further, as the inorganic peroxide, a known inorganic peroxide such as peroxydisulfuric acid, a peroxide of an alkali metal, a peroxide of an alkaline earth metal, and a peroxide of a transition metal can be applied. Examples of the peroxydisulfuric acid include sodium peroxodisulfate, potassium peroxodisulfate, aluminum peroxodisulfate, and ammonium peroxodisulfate. Examples of the peroxide of an alkali metal include lithium peroxide, sodium peroxide, and potassium peroxide. Examples of the peroxide of an alkaline earth metal include magnesium peroxide, calcium peroxide, and barium peroxide. Examples of the peroxide of a transition metal include zinc peroxide, cadmium oxide, and mercury peroxide.

Further, examples of the azo compound include 2,2-azobisisobutyronitrile, 2,2-azobis-2,4-dimethylvaleronitrile, 4,4-azobis-4-cyanovaleric acid, 1,1-azobis-1-cyclohexanecarbonitrile, dimethyl-2,2-azobisisobutyrate, and 2,2-azobis-(2-aminopropane)dihydrochloride.

The thermal polymerization initiator that is a second polymerization initiator may be mixed in the curable composition for stereolithography in advance. That is, the curable composition for stereolithography may include a first polymerization initiator for stereolithography and a thermal polymerization initiator that is a second polymerization initiator different from the first polymerization initiator. In the case of mixing the thermal polymerization initiator in advance, azo compounds are favorable among the thermal polymerization initiators described above from the viewpoint of stability and polymerization activity of the curable composition for stereolithography, and 1,1-azobis-1-cyclohexanecarbonitrile is more favorable.

Further, the thermal polymerization initiator may be added later to an unpolymerized portion on the surface of a denture base obtained by stereolithography from the viewpoint of preservation stability of the curable composition for stereolithography. The method of adding the thermal polymerization initiator later is not particularly limited, but a method of applying and adhering the thermal polymerization initiator to the surface of an artificial tooth and causing the artificial tooth to be in contact with an unpolymerized portion to dissolve it in the unpolymerized portion is favorable. In the case of adding the thermal polymerization initiator later, an organic peroxide is favorable and diacylperoxide is particularly favorable among the thermal polymerization initiators. In particular, benzoylperoxide is more favorably used from the viewpoint of reactivity and solubility.

The amount of the thermal polymerization initiator used is favorably 0.01 to 10 mass parts with respect to 100 mass parts of a photocurable monomer.

In order to activate these thermal polymerization initiators to strengthen the adhesion between the denture base and the artificial tooth, heating may be performed. The heating temperature and the heating time are not particularly problematic as long as the performance of a plate denture to be prepared is not impaired, and may be determined by the half-life of the thermal polymerization initiator. More specifically, it only needs to perform heating for one hour at the temperature at which the half-life of the thermal polymerization initiator is one hour or less. A known method can be used as the heating method without any limitation. As, specific examples, a dryer, a vacuum dryer, a blower dryer, an incubator, an inert oven, or the like can be used.

Further, by combining the organic peroxide described above with a polymerization accelerator, the heating temperature can be lowered or the organic peroxide can be activated at room temperature.

Specific examples of the polymerization accelerator include amines, a sulfinic acid, salts thereof, a copper compound, and a tin compound.

The amines used as a polymerization accelerator can be divided into aliphatic amines and aromatic amines. Examples of the aliphatic amines include a primary aliphatic amine such as n-butylamine, n-hexylamine, and n-octylamine; a secondary aliphatic amine such as diisopropylamine, dibutylamine, and N-methylethanolamine; and a tertiary aliphatic amine such as N-methyl diethanolamine, N-ethyl diethanolamine, N-n-butyl diethanolamine, N-lauryl diethanolamine, 2-(dimethylamino)ethyl(meth)acrylate, N-methyl diethanolamine di(meth)acrylate, N-ethyl diethanolamine di(meth)acrylate, triethanolamine mono(meth))acrylate, triethanolamine di(meth)acrylate, triethanolamine tri(meth)acrylate, triethanolamine, trimethylamine, triethylamine, and tributylamine.

Further, examples of the aromatic amine include N,N-bis (2-hydroxyethyl)-3,5-dimethylaniline, N,N-bis(2-hydroxyethyl)-p-toluidine, N,N-bis(2-hydroxyethyl)-3,4-dimethylaniline, N,N-bis(2-hydroxyethyl)-4-ethylaniline, N,N-bis(2-hydroxyethyl)-4-isopropylaniline, N,N-bis(2-hydroxyethyl)-4-t-butylaniline, N,N-bis(2-hydroxyethyl)-3,5-diisopropylaniline, N,N-bis(2-hydroxyethyl)-3,5-di-t-butylaniline, N,N-dimethylaniline, N,N-dimethyl-p-toluidine, N,N-dimethyl-m-toluidine, N,N-diethyl-p-toluidine, N,N-dimethyl-3,5-dimethylaniline, N,N-dimethyl-3,4-dimethylaniline, N,N-dimethyl-4-ethylaniline, N,N-dimethyl-4-isopropylaniline, N,N-dimethyl-4-t-butylaniline, N,N-dimethyl-3,5-di-t-butylaniline, 4-(N,N-dimethylamino)ethyl benzoate, 4-(N,N-dimethylamino)methyl benzoate, 4-(N,N-dimethylamino)n-butoxyethyl benzoate, 4-(N,N-dimethylamino)benzoic acid 2-(methacryloyloxy) ethyl, 4-(N,N-dimethylamino)benzophenone, and 4-dimethylaminobutyl benzoate. Among these, from the viewpoint of imparting excellent curability to the composition, at least one type selected from the group consisting of N,N-bis(2-hydroxyethyl)-p-toluidine, 4-(N,N-dimethylamino)ethyl benzoate, 4-(N,N-dimethylamino)n-butoxyethyl benzoate, and 4-(N,N-dimethylamino)benzophenone is favorably used.

Examples of the sulfinic acid and salts thereof used as a polymerization accelerator include p-toluenesulfinic acid, sodium p-toluenesulfinate, potassium p-toluenesulfinate, lithium p-toluenesulfinate, calcium p-toluenesulfinate, benzenesulfinic acid, sodium benzenesulfinate, potassium benzenesulfinate, lithium benzenesulfinate, calcium benzenesulfinate, 2,4,6-trimethylbenzenesulfinic acid, sodium 2,4,6-trimethylbenzenesulfinate, potassium 2,4,6-trimethylbenzenesulfinate, lithium 2,4,6-trimethylbenzenesulfinate, calcium 2,4,6-trimethylbenzenesulfinate, 2,4,6-triethylbenzenesulfinic acid, sodium 2,4,6-triethylbenzenesulfinate, potassium 2,4, 6-triethylbenzenesulfinate, lithium 2,4,6-triethylbenzenesulfinate, calcium 2,4,6-triethylbenzenesulfinate, 2,4,6-triisopropylbenzenesulfinic acid, sodium 2,4,6-triisopropylbenzenesulfinate, potassium 2,4,6-triisopropylbenzenesulfinate, lithium 2,4,6-triisopropylbenzenesulfinate, and calcium 2,4,6-triisopropylbenzenesulfinate, and sodium benzenesulfinate, sodium p-toluenesulfinate, and sodium 2,4,6-triisopropylbenzenesulfinate are favorable.

As the copper compound used as a polymerization accelerator, for example, acetylacetone copper, copper(II) acetate, copper oleate, copper(II) chloride, or copper(II) bromide is suitably used.

Examples of the tin compound used as a polymerization accelerator include di-n-butyltin dimalate, di-n-octyltin dimalate, di-n-octyltin dilaurate, and di-n-butyltin dilaurate. Among them, suitable tin compounds are di-n-octyltin dilaurate and di-n-butyltin dilaurate.

Among these polymerization accelerators, tertiary aromatic amines are favorable from the viewpoint of reactivity and preservation stability, and N,N-bis(2-hydroxyethyl)-p-toluidine is most favorable among the tertiary aromatic amines. Further, two or more kinds of these polymerization accelerators may be used as necessary.

The method of mixing these polymerization accelerators is not particularly limited, but it is favorable to mix the polymerization accelerator in a stereolithography resin in advance. By mixing the polymerization accelerator in a stereolithography resin in advance, it remains on an unpolymerized portion of the prepared denture base and an organic peroxide on the surface of an artificial tooth is in contact with the polymerization accelerator, thereby making it possible to adhere the artificial tooth and the denture base to each other.

The mixing amount of the polymerization accelerator is favorably 0.1 to 1 mass parts with respect to 100 mass parts of the photocurable monomer.

A photopolymerization initiator may be used as a second polymerization initiator. Examples of such a photopolymerization initiator include those described as a photopolymerization initiator for stereolithography, and it only needs to select one different from one used as a photopolymerization initiator for stereolithography. Specifically, it can be excited by light having a wavelength different from that of a first polymerization initiator for stereolithography to initiate polymerization. In particular, one having the lower limit of an absorption wavelength effective for the initiation of polymerization, which is 30 nm or more longer than the upper limit of an absorption wavelength effective for the initiation of polymerization of a first polymerization initiator for stereolithography, is favorable. By using an LED light having a wavelength limited by using, as a second polymerization initiator, one having an excitation wavelength longer than the excitation wavelength of a first polymerization initiator for stereolithography, it is possible to more strongly adhere the denture base and the artificial tooth to each other in a short time.

As a specific example of such a photopolymerization initiator, in the case where a photopolymerization initiator for stereolithography is bis(2,4,6-trimethylbenzoyl)phenylphosphineoxide, a second polymerization initiator is favorably a combination of α-diketone as a photoradical polymerization initiator and a tertiary amine as a reducing compound, and is more favorably a combination of camphorquinone and an aromatic tertiary amine. Specifically, a combination of camphorquinone and 4-(N,N-dimethylamino)ethyl benzoate is more favorable. The method of mixing the photopolymerization initiator that is a second polymerization initiator is not particularly limited, but it is more favorable to mix the photopolymerization initiator is favorably in the curable composition for stereolithography in advance. That is, the curable composition for stereolithography favorably includes a first polymerization initiator for stereolithography and a photopolymerization initiator that is a second polymerization initiator different from the first polymerization initiator.

The mixing amount of the photopolymerization initiator and the reducing compound as a second polymerization initiator is similar to that in the case of the first polymerization initiator for stereolithography. In the case where the second polymerization initiator is a combination of camphorquinone and 4-(N,N-dimethylamino)ethyl benzoate, the mixing amount thereof is favorably in the range of 0.1 to 1 mass parts of camphorquinone and 0.1 to 1 mass parts of 4-(N,N-dimethylamino)methyl benzoate with respect to 100 mass parts of a photocurable monomer.

In the present invention, the viscosity of the curable composition for stereolithography at 25° C. and 50 rpm, which has been measured using an E-type viscometer, may be adjusted in accordance with the stereolithography method from the viewpoint of aptitude for preparing a dental prosthesis such as a denture base by stereolithography.

For example, in the case of preparing a dental prosthesis such as a denture base by the SLA method, the viscosity is favorably 50 m·Pas to 1500 m·Pas, and more favorably 50 m·Pas to 1000 m·Pas. In the case of preparing a dental prosthesis such as a denture base by the DLP method, the viscosity is favorably 50 m·Pas to 500 m·Pas, and more favorably 50 m·Pas to 250 m·Pas. In the case of preparing a dental prosthesis such as a denture base by the inkjet method, the viscosity is favorably 20 m·Pas to 500 m·Pas, and more favorably 20 m·Pas to 100 m·Pas.

<Artificial Tooth>

Examples of the artificial tooth include an acrylic resin tooth and an indirect composite resin, and the artificial tooth may include a filler or the like. As the artificial tooth, a commercially available one can be used or one prepared by three-dimensional modeling such as stereolithography, selective laser modeling, and fused deposition modeling or NC processing (cutting processing) on the basis of shape data created using a CAD/CAM system can be used. For example, in the case of preparing an artificial tooth by stereolithography, the above-mentioned curable composition for stereolithography colored with the crown color can be used. Further, the artificial tooth may be one tooth or may be connected artificial teeth in which two or more teeth are connected.

Further, the artificial tooth may have a shape that fits into the denture base. By adhering the artificial tooth and the denture base to each other in a fitted state, it is possible to not only strengthen the adhesion between the denture base and the artificial tooth but also reliably locate the artificial tooth at a correct position. The shape that fits into the denture base is such that the artificial tooth arrangement portion of the denture base, favorably the arrangement portion having a recessed shape, and the artificial tooth base have a snap-fit shape, thereby mechanically inhibiting it from falling by using the elasticity of the material. As the lock shape of the snap fit, a cantilever lock, a planner lock, a trap lock, a torsional lock, an annular lock, or the like can be used. The annular lock has a shape in which a catch and an edge are connected in a cylindrical shape, and is suitable as a fitting shape of the artificial tooth and the denture base. For example, an artificial tooth with a cylindrically connected ridge (edge) on the side surface of the artificial tooth is used, a cylindrical recessed shape (catch) that pairs with the edge of the side surface of the artificial tooth is given to the side surface of the artificial-tooth-arrangement recessed portion of the denture base, and the edge of the artificial tooth and the catch of the denture base fit with each other, thereby locating the artificial tooth at a correct position on the denture base.

<Denture Base>

In the present invention, the denture base may be a denture base for a complete denture (so-called full denture) or a denture base for a partial denture. Further, the denture base may be a denture base for a maxillary denture, a denture base for a mandibular denture, or a set of a maxillary denture base and a mandibular denture base.

In the present invention, as the method of producing a denture base, a known method of preparing a denture base by a CAD/CAM system may be used. For example, it only needs to include a process of acquiring artificial-tooth-shape data indicating the three-dimensional shape of an artificial tooth, a process of creating a three-dimensional model of a plate denture using the artificial-tooth-shape data, a process of deleting the shape part corresponding to the artificial-tooth-shape data from the three-dimensional model of the plate denture and forming an artificial-tooth-arrangement recessed portion to create denture-base-shape data indicating the three-dimensional shape of the denture base, and a process of preparing a denture base on the basis of the denture-base-shape data. In the process of creating denture-base-shape data, a snap-fit shape that pairs with the shape given to the artificial tooth may be given to the artificial-tooth-arrangement recessed portion of the denture base.

In the process of preparing a denture base, a denture base is prepared using a three-dimensional printer to which the denture-base-shape data has been input. The three-dimensional printer that can be used in this process is capable of adopting stereolithography such as the SLA method, the DLP method, and the inkjet method.

In modeling using an existing stereolithography 3D printer, after modeling by the 3D printer, cleaning is performed using a solvent such as isopropyl alcohol to remove an unpolymerized monomer. In the present invention, by not performing the cleaning, an unpolymerized curable composition for stereolithography present on the surface of the model obtained by stereolithography can be used to adhere the artificial tooth.

<Process of Adhering Denture Base and Artificial Tooth to Each Other>

The method of producing a plate denture according to the present invention includes a process of adhering a photochemically solidified denture base and an artificial tooth to each other by polymerizing an unpolymerized portion formed of an unpolymerized curable composition for stereolithography present on the surface of the denture base. In this case, the photochemically solidified denture base is not cleaned and the artificial tooth is arranged as it is. After that, by irradiating light having a wavelength corresponding to the curable composition for stereolithography to polymerize the unpolymerized curable composition for stereolithography, the artificial tooth can be adhered to the denture base. Further, by allowing a second polymerization initiator to be present in the curable composition for stereolithography, the unpolymerized curable composition for stereolithography can be polymerized by the second polymerization initiator and the adhesion of the artificial tooth can be more strengthened. A specific adhesion process can be divided as follows in accordance with the presence or absence of mixing of a second polymerization initiator and the type of a second polymerization initiator.

[1] Case of Using No Second Polymerization Initiator

A photocurable composition for stereolithography is used to prepare a denture base by a stereolithography 3D printer. After taking out the obtained denture base from the apparatus, the artificial tooth is arranged while an unpolymerized curable composition for stereolithography is present on the surface of the denture base without cleaning the denture base. Next, an irradiator capable of applying light having a wavelength corresponding to the first polymerization initiator for stereolithography in the photocurable composition for stereolithography is used to irradiate the denture base with light, thereby adhering the denture base and the artificial tooth to each other. That is, as a polymerization initiator for adhering an artificial tooth, the first polymerization initiator for stereolithography is used.

[2] Case of Using Second Polymerization Initiator

It is favorable to use a photopolymerization initiator different from a first polymerization initiator as a second polymerization initiator. An acrylic photocurable resin including a photopolymerization initiator that initiates polymerization with an excitation wavelength different from that of stereolithography is used to prepare a denture base by a stereolithography 3D printer. After taking out the obtained denture base from the apparatus, the artificial tooth is arranged without cleaning the denture base. Next, an irradiator capable of applying light having a wavelength corresponding to the photopolymerization initiator as a second polymerization initiator is used to irradiate the denture base with light, thereby adhering the denture base and the artificial tooth to each other.

As a specific example, for example, a curable composition for stereolithography including bis(2,4,6-trimethylbenzoyl) phenylphosphineoxide (absorption wavelength effective for initiation of polymerization: ultraviolet to 420 nm) as a photopolymerization initiator for stereolithography that can be polymerized and cured by a stereolithography printer including a light source of 405 nm as well as camphorquinone (absorption wavelength effective for initiation of polymerization:450 to 490 nm) as a photopolymerization initiator as a second polymerization initiator that does not substantially generate polymerization activity by light irradiation of 405 nm is prepared. Subsequently, the prepared curable composition for stereolithography is used to model a denture base by a stereolithography 3D printer including a light source of 405 nm. After taking out the obtained denture base from the apparatus, the artificial tooth is arranged while an unpolymerized curable composition for stereolithography is present on the surface of the denture base without cleaning the denture base. Subsequently, a light irradiator capable of applying light having a wavelength of 470 nm to perform polymerization with camphorquinone that is another photopolymerization initiator in the photocurable composition for stereolithography is used to perform light irradiation, thereby adhering the denture base and the artificial tooth to each other.

By including a photopolymerization initiator as a second polymerization initiator that does not generate polymerization activity during stereolithography in addition to a photopolymerization initiator as a first polymerization initiator for stereolithography, high polymerization activity can be achieved by performing light irradiation corresponding to another photopolymerization initiator when adhering the artificial tooth, thereby making it possible to more strongly adhere the denture base and the artificial tooth to each other.

EXAMPLE

Although the present invention will be specifically described below on the basis of Examples and Comparative Examples, the present invention is not limited to the following Examples. The materials used are shown below.

<Compound>
Photocurable monomer;
Methylmethacrylate,
Urethane dimethacrylate, 2,2-bis(4-methacryloyloxypolyethoxyphenyl)propane (hereinafter, abbreviated as D-2.6E),
Trimethylolpropane trimethacrylate.
Photopolymerization initiator (absorption wavelength effective for initiation of polmerization);
Bis(2,4,6-trimethylbenzoyl)phenylphosphineoxide (ultraviolet to 420 nm)
Camphorquinone (450 to 490 nm)
Reducing compound;
4-(N,N-dimethylamino)ethyl benzoate
Filler;
PMMA (molecular weight of 100,000 to 400,000): manufactured by Negami Chemical Industrial Co. Ltd., D250ML, average particle diameter of 36 μm <Artificial Tooth>
Acrylic resin artificial tooth;
Commercially available artificial tooth: New Ace Anterior and Million Posterior (manufactured by YAMAHACHI DENTAL MFG., CO.)
Custom artificial tooth: custom artificial tooth with a projecting shape (edge structure for snap fit) having a height of 1 mm connected around the side surface of the artificial tooth on the basis of the shapes of New Ace Anterior and Million Posterior Three-dimensional data of the custom artificial tooth was created by using a model scanner (manufactured by Dental Wings Inc., 3 series) to acquire three dimensional data of New Ace Anterior and Million Posterior and giving a projecting shape having a height of 1 mm so as to be connected at a position of 1 mm from the basal place of the artificial tooth of the obtained three-dimensional data. A resin disk formed of PMMA (manufactured by YAMAHACHI DENTAL MFG., CO., Product name: Resin Disk) was set in a milling machine DWX-50 (manufactured by Roland DG Corporation.), the resin disk was cut on the basis of the three-dimensional data of the custom artificial tooth, and a custom artificial tooth having an edge was prepared.

<Design of Plate Denture and Method of Creating Three-Dimensional Data of Denture Base>

The design of a maxillary plate denture for preparing a maxillary plate denture and three-dimensional data of a maxillary denture base were created as follows.

A mandibular model (including 14 teeth) that matches with a maxillary edentulous model was prepared, and a model scanner (manufactured by Dental Wings Inc., 3 series) was used to acquire three-dimensional data of the maxillary edentulous model and the mandibular model. Further, a model scanner was used to acquire three-dimensional data of the artificial teeth (anterior teeth and posterior teeth, 14 teeth in total) to be used. After arranging the three-dimensional data of 14 artificial teeth at the ideal position with respect to the obtained three-dimensional data of the maxillary edentulous model, the position of the artificial teeth data arranged on the maxillary edentulous model is adjusted such that the three-dimensional data of the mandibular model and all the artificial teeth are engaged with each other, a denture base shape was given in accordance with the edentulous mucosal surface, and three-dimensional data of a plate denture (full denture) was created. Finally, the shape data of the artificial teeth was deleted from the three-dimensional data of the plate denture (full denture) to create three-dimensional data of a maxillary denture base including an artificial-tooth-arrangement recessed portion.

The evaluation method is shown below.

<Evaluation of Plate Denture Preparation Time>

The total time of the denture base preparation time, the cleaning process time, and the artificial tooth adhesion or preparation time was used as the plate denture preparation time, and the lengths of the times were compared with each other.

(Plate Denture Preparation Time)

The time during which a 3D printer or a cutting machine had been actually driven when modeling a denture base by stereolithography or cutting was used as the denture base preparation time.

(Cleaning Process Time)

The time required for the cleaning work was used as the cleaning process time. In the case where there was no cleaning process, it is described as none.

(Artificial Tooth Adhesion or Preparation Time)

The time required for applying an adhesive (only when necessary), arranging artificial teeth, and performing polymerization work for adhering the artificial teeth to/on the modeled denture base or for performing stereolithography of artificial teeth on the denture base was used as the artificial tooth adhesion or preparation time.

<Evaluation of Occlusion of Plate Denture>

The occlusion of a plate denture was evaluated by visually observing the occlusion between the plate denture (maxillary full denture) and the mandibular model in accordance with the following criteria.

A: Very good. All the artificial teeth of the maxillary full denture are in occlusal contact.

B: Good. Eight or more artificial teeth of the maxillary full denture are in occlusal contact and rattling does not occur.

C: There is partial rattling. Four to seven teeth of the maxillary full denture are in occlusal contact and slight rattling occurs.

D: There is a lot of rattling. Three or less teeth of the maxillary full denture are in occlusal contact and rattling occurs with two occlusal contacts as fulcrums.

<Evaluation of Adhesion Between Artificial Tooth and Denture Base>

A test piece for adhesion evaluation was prepared by the method described in Examples, and the adhesiveness thereof was evaluated.

The evaluation of adhesiveness was performed by the following method. A hole was formed in the center of the right central incisor of the plate denture (maxillary full denture) in advance, an S-shaped hook was attached to the tooth of the test piece obtained above, a weight of 10 Kg was put thereon, and the degree of adhesion when the denture base was pulled up by hand was evaluated in accordance with the following criteria.

A: It cannot come off even if it is pulled for 30 seconds or more.

B: It comes off if it is pulled for 30 seconds.

C: The artificial tooth came off immediately.

Example 1

A maxillary plate denture was prepared as a plate denture.

First, the photocurable composition for stereolithography described in Table 1 was used to perform stereolithography of the maxillary denture base data obtained by designing in accordance with commercially available artificial teeth by the method of designing a plate denture and creating three-dimensional data of a denture base described above using a stereolithography 3D printer (Formlabs, Form2, irradiation wavelength of 405 nm) to prepare a maxillary denture base having a recessed shape for arranging artificial teeth. After that, the obtained denture base is not cleaned, and commercially available artificial teeth were arranged on the recessed portion and irradiated with light for 3 minutes by a polymerization apparatus for dental technicians (α-light V manufactured by MORITA TOKYO MFG. CORP., wavelength of 400 to 408 nm, 465 to 475 nm) while being immersed in hot water of 40° C. to adhere the artificial teeth and the denture base to each other, thereby preparing a plate denture. After that, evaluation of the plate denture preparation time and evaluation of occlusion of the plate denture were performed.

Further, similarly, a denture base having a recessed shape in which a maxillary right central incisor of commercially available artificial teeth can be arranged with a length of 30 mm×a width of 30 mm×a height of 10 mm was modeled using a stereolithography 3D printer (Formlabs, Form2, irradiation wavelength of 405 nm). After that, the obtained denture base was not cleaned, and the commercially available artificial teeth were arranged on the recessed portion and irradiated with light for 3 minutes by a polymerization apparatus for dental technicians (α-light V manufactured by MORITA TOKYO MFG. CORP., wavelength of 400 to 408 nm, 465 to 475 nm) while being immersed in hot water of 40° C. to adhere the artificial teeth and the denture base to each other, thereby preparing a plate denture. After that, the adhesiveness was evaluated.

The evaluation results are shown in Table 2.

Example 2

The photocurable composition for stereolithography described in Table 1 was used to perform stereolithography of the maxillary denture base data obtained by designing in accordance with custom artificial teeth having an edge structure for snap fit by the method of designing a plate denture and creating three-dimensional data of a denture base described above using a stereolithography 3D printer (Formlabs, Form2, irradiation wavelength of 405 nm) to prepare a maxillary denture base having a catch structure corresponding to the edge structure given to the artificial teeth in a recessed shape for arranging artificial teeth. After that, the obtained denture base was not cleaned, and the custom artificial teeth were arranged so as to be fitted into the recessed portion and irradiated with light for 3 minutes by a polymerization apparatus for dental technicians (α-light V manufactured by MORITA TOKYO MFG. CORP., wavelength of 400 to 408 nm, 465 to 475 nm) while being immersed in hot water of 40° C. to adhere the artificial teeth and the denture base to each other, thereby preparing a plate denture. After that, evaluation of the plate denture preparation time and evaluation of occlusion of the plate denture were performed.

Further, a denture base having a recessed shape in which a maxillary right central incisor can be arranged with a length of 30 mm×a width of 30 mm×a height of 10 mm was modeled using a stereolithography 3D printer (Formlabs, Form2, irradiation wavelength of 405 nm). At this time, three-dimensional data was created such that the recessed shape gives a catch structure corresponding to the edge structure for snap fit of the custom artificial teeth to be used, and modeling was performed. After that, the obtained denture base was not cleaned, and the custom artificial tooth were arranged on the recessed portion and irradiated with light for 3 minutes by a polymerization apparatus for dental technicians (α-light V manufactured by MORITA TOKYO MFG. CORP., wavelength of 400 to 408 nm, 465 to 475 nm) while being immersed in hot water of 40° C. to adhere the artificial teeth and the denture base to each other, thereby preparing a plate denture. After that, the adhesiveness was evaluated.

The evaluation results are shown in Table 2.

Example 3

The photocurable composition for stereolithography described in table 1 was used to perform stereolithography of the maxillary denture base data obtained by designing in accordance with commercially available artificial teeth by the method of designing a plate denture and creating three-dimensional data of a denture base described above using a stereolithography 3D printer (Formlabs, Form2, irradiation wavelength of 405 nm) to prepare a maxillary denture base having a recessed shape for arranging artificial teeth. After that, the obtained denture base was not cleaned, and the commercially available artificial tooth were arranged on the recessed portion and irradiated with light for 3 minutes by a polymerization apparatus for dental technicians (α-light V manufactured by MORITA TOKYO MFG. CORP., wavelength of 400 to 408 nm, 465 to 475 nm) while being immersed in hot water of 40° C. to adhere the artificial teeth and the denture base to each other, thereby preparing a plate denture. After that, evaluation of the plate denture preparation time and evaluation of occlusion of the plate denture were performed.

Further, similarly, a denture base having a recessed shape in which a maxillary right central incisor of commercially available artificial teeth can be arranged with a length of 30 mm×a width of 30 mm×a height of 10 mm was modeled using a stereolithography 3D printer (Formlabs, Form2, irradiation wavelength of 405 nm). After that the obtained denture base was not cleaned, and the commercially available artificial teeth were arranged on the recessed portion and irradiated with light for 3 minutes by a polymerization apparatus for dental technicians (α-light V manufactured by MORITA TOKYO MFG. CORP., wavelength of 400 to 408 nm, 465 to 475 nm) while being immersed in hot water of 40° C. to adhere the artificial teeth and the denture base to each other, thereby preparing a plate denture. After that, the adhesiveness was evaluated. After that, the adhesiveness was evaluated.

The evaluation results are shown in Table 2.

Comparative Example 1

IvoBase (manufactured by Ivoclar) that is a resin disk for cutting a denture base formed of an acrylic resin was attached to a cutting machine (DWX-50 manufactured by Roland DG Corporation.), and the maxillary denture base data obtained by designing in accordance with commercially available artificial teeth by the method of designing a plate denture and creating three-dimensional data of a denture base described above was used to prepare a maxillary denture base having a recessed shape for arranging artificial teeth by cutting. After that, a small amount (0.1 to 0.3 g) of Beautiful II manufactured by SHOFU INC., which is a dental composite resin, was built-up as a temporary adhesive on the respective recessed portions, and then, commercially available artificial teeth were arranged on the recessed portion on which the temporary adhesive was built-up. After that, light was applied thereto for 30 seconds by a visible light irradiator (light source wavelength of 470 nm) to cure the temporary adhesive, and thus, the commercially available artificial teeth were temporarily adhered to the maxillary denture base. Next, as an acrylic resin, PalaXpress ultra manufactured by Heraeus Kulzer GmbH (chemically polymerized resin for denture base) was poured into the gap between the denture base and the artificial teeth and polymerized to adhere the artificial teeth and the denture base to each other, thereby preparing a plate denture. After that, evaluation of the plate denture preparation time and evaluation of occlusion of the plate denture were performed.

Further, similarly, a denture base having a recessed shape in which a maxillary right central incisor of commercially available artificial teeth can be arranged with a length of 30 mm×a width of 30 mm×a height of 10 mm was prepared using a cutting machine (DWX-50 manufactured by Roland DG Corporation.). After that, as a temporary adhesive, a small amount (0.1 to 0.3 g) of Beautiful II manufactured by SHOFU INC., which is a dental composite resin, was built-up on the recessed portion, and then, commercially available artificial teeth were arranged on the recessed portion on which the temporary adhesive was built-up. After that, light was applied thereto for 30 seconds by a visible light irradiator (light source wavelength of 470 nm) to cure the temporary adhesive, and thus, the commercially available artificial teeth were temporarily adhered to the denture base. Next, as an acrylic resin, PalaXpress ultra manufactured by Heraeus Kulzer GmbH (chemically polymerized resin for denture base) was poured into the gap between the denture base and the artificial teeth and polymerized to adhere the artificial teeth and the denture base to each other, thereby preparing a plate denture. After that, the adhesiveness was evaluated.

The evaluation results are shown in Table 2.

Comparative Example 2

The photocurable composition for stereolithography described in Table 1 was used to perform stereolithography of the maxillary denture base data obtained by designing in accordance with commercially available artificial teeth by the method of designing a plate denture and creating three-dimensional data of a denture base described above using a stereolithography 3D printer (Formlabs, Form2, irradiation wavelength of 405 nm) to prepare a maxillary denture base having a recessed shape for arranging artificial teeth. After that, the obtained denture base was placed in a cleaning bath of isopropyl alcohol, cleaned twice, and dried. After that, as a temporary adhesive, a small amount (0.1 to 0.3 g) of Beautiful II manufactured by SHOFU INC., which is a dental composite resin, was built-up on the respective recessed portions, and then, commercially available artificial teeth were arranged on the recessed portion on which the temporary adhesive was built-up. After that, light was applied thereto for 30 seconds by a visible light irradiator (light source wavelength of 470 nm) to cure the temporary adhesive, and thus, the commercially available artificial teeth were temporarily adhered to the denture base. Next, as an acrylic resin, PalaXpress ultra manufactured by Heraeus Kulzer GmbH (chemically polymerized resin for denture base) was poured into the gap between the denture base and the artificial teeth and polymerized to adhere the artificial teeth and the denture base to each other, thereby preparing a plate denture. After that, evaluation of the plate denture preparation time and evaluation of occlusion of the plate denture were performed.

Further, similarly, a denture base having a recessed shape in which a maxillary right central incisor of commercially available artificial teeth can be arranged with a length of 30 mm×a width of 30 mm×a height of 10 mm was modeled using a stereolithography 3D printer (Formlabs, Form2, irradiation wavelength of 405 nm). After that, the denture base was placed in a cleaning bath of isopropyl alcohol, cleaned twice, and dried. After that, as a temporary adhesive, a small amount (0.1 to 0.3 g) of Beautiful II manufactured by SHOFU INC., which is a dental composite resin, was built-up on the respective recessed portions, and then, commercially available artificial teeth were arranged on the recessed portion on which the temporary adhesive was built-up. After that, light was applied thereto for 30 seconds by a visible light irradiator (light source wavelength of 470 nm) to cure the temporary adhesive, and thus, the commercially available artificial teeth were temporarily adhered to the denture base. Next, as an acrylic resin, PalaXpress ultra manufactured by Heraeus Kulzer GmbH (chemically polymerized resin for denture base) was poured into the gap between the denture base and the artificial teeth and polymerized to adhere the artificial teeth and the denture base to each other, thereby preparing a plate denture. After that, the adhesiveness was evaluated.

The evaluation results are shown in Table 2.

Comparative Example 3

The photocurable composition for stereolithography described in Table 1 was used to perform stereolithography of the maxillary denture base data obtained by designing in accordance with commercially available artificial teeth by the method of designing a plate denture and creating three-dimensional data of a denture base described above using a stereolithography 3D printer (Formlabs, Form2, irradiation wavelength of 405 nm) to prepare a maxillary denture base having a recessed shape for arranging artificial teeth. The obtained maxillary denture base was placed in a cleaning bath of isopropyl alcohol, cleaned twice, and dried. After that, commercially available artificial teeth were arranged on the recessed portion and irradiated with light for 3 minutes by a polymerization apparatus for dental technicians (α-light V manufactured by MORITA TOKYO MFG. CORP., wavelength of 400 to 408 nm, 465 to 475 nm) while being immersed in hot water of 40° C., thereby preparing a plate denture. After that, evaluation of the plate denture preparation time and evaluation of occlusion of the plate denture were performed.

Further, similarly, a denture base having a recessed shape in which a maxillary right central incisor of commercially available artificial teeth can be arranged with a length of 30 mm×a width of 30 mm×a height of 10 mm was modeled using a stereolithography 3D printer (Formlabs, Form2, irradiation wavelength of 405 nm). After that, the obtained denture base was placed in a cleaning bath of isopropyl alcohol, cleaned twice, and dried. After that, commercially available artificial teeth were arranged on the recessed portion and irradiated with light for 3 minutes by a polymerization apparatus for dental technicians (α-light V manufactured by MORITA TOKYO MFG. CORP., wavelength of 400 to 408 nm, 465 to 475 nm) while being immersed in hot water of 40° C. to prepare a test piece. After that, the adhesiveness was evaluated.

The evaluation results are shown in Table 2.

TABLE 1

| Components (mass parts) of curable composition for stereolithography | | Example1,2 | Example3 | Comparative Example2,3 |
|---|---|---|---|---|
| Photocurable monomer | Methyl methacrylate | 20 | 20 | 20 |
| | D-2.6E | 38 | 38 | 38 |
| | Urethane dimethacrylate | 30 | 30 | 30 |
| | Trimethylolpropane trimethacrylate | 10 | 10 | 10 |
| First polymerization initiator | Bis(2,4,6-trimethylbenzoyl) phenylphosphineoxide | 2 | 1.2 | 2 |
| Filler | PMMA | 10 | 10 | 10 |
| Second polymerization initiator | Camphorquinone | — | 0.6 | — |
| | 4-(N,N-dimethylamino) ethylbenzoate | — | 0.2 | — |

TABLE 2

| | | Denture preparation time | | | | | | |
|---|---|---|---|---|---|---|---|---|
| | Denture base preparation | | Cleaning process | Artificial tooth adhesion or preparation | | Total | Engagement | Adhesion strength |
| | Method | Time | Time | Method | Time | Time | | |
| Example1 | Stereolithography | 1 hour 30 minutes | None | Only light irradiation | 5 minutes | 1 hour 35 minutes | B | B |
| Example2 | Stereolithography | 1 hour 30 minutes | None | Artificial tooth fitting shape + light irradiation | 5 minutes | 1 hour 35 minutes | A | A |
| Example3 | Stereolithography | 1 hour 30 minutes | None | Stereolithography × Photopolymerization (different wavelength) | 5 minutes | 1 hour 35 minutes | A | A |
| Comparative Example 1 | Cutting | 5 hours | None | Dental resin adhesion | 30 minutes | 5 hours 30 minutes | D | B |
| Comparative Example 2 | Stereolithography | 1 hour 30 minutes | 10 minutes | Dental resin adhesion | 30 minutes | 2 hours 10 minutes | D | B |
| Comparative Example 3 | Stereolithography | 1 hour 30 minutes | 10 minutes | Cleaning and light irradiation | 5 minutes | 1 hour 45 minutes | D * | C |

* Artificial tooth and denture base are not bonded to each other

The invention claimed is:

1. A method of producing a plate denture characterized by comprising:
    preparing a denture base having an artificial-tooth-arrangement recessed portion by stereolithography by a 3D printer using a curable composition for stereolithography including a first polymerization initiator for stereolithography and a second polymerization initiator different from the first polymerization initiator, an unpolymerized portion including the second polymerization initiator being present on a surface of the denture base; and
    directly adhering, after arranging an artificial tooth in the artificial-tooth-arrangement recessed portion, the artificial tooth and the denture base to each other without using an adhesive by causing the second polymerization initiator to act to polymerize the unpolymerized portion present on the surface of the denture base.

2. The method of producing a plate denture according to claim 1, wherein
    the artificial tooth and the denture base are adhered to each other in a fitted state.

3. The method of producing a plate denture according to claim 1, wherein
    the second polymerization initiator is a radical polymerization initiator.

4. The method of producing a plate denture according to claim 1, wherein
    the second polymerization initiator is a photopolymerization initiator having an excitation wavelength different from that of the first polymerization initiator.

* * * * *